(12) United States Patent
Luan et al.

(10) Patent No.: US 11,669,652 B2
(45) Date of Patent: Jun. 6, 2023

(54) ROBUST TOPOLOGICAL OPTIMIZATION DESIGN METHOD OF DAMPING COMPOSITE STIFFENED CYLINDRICAL SHELL BOX STRUCTURE

(71) Applicants: Harbin Marine Boiler and Turbine Research Institute, Harbin (CN); BEIJING INSTITUTE OF TECHNOLOGY, Beijing (CN); University of Shanghai for Science and Technology, Shanghai (CN)

(72) Inventors: Shenggang Luan, Harbin (CN); Hongzhi Ji, Harbin (CN); Yanjiong Yue, Harbin (CN); Xunmin Yin, Harbin (CN); Dongdong Zhang, Shanghai (CN); Lihui Zhao, Shanghai (CN); Shouwen Yao, Beijing (CN); Yingchun Bai, Beijing (CN)

(73) Assignees: Harbin Marine Boiler and Turbine Research Institute, Harbin (CN); BEIJING INSTITUTE OF TECHNOLOGY, Beijing (CN); University of Shanghai for Science and Technology, Shanghai (CN)

( * ) Notice: Subject to any disclaimer, the term of this patent is extended or adjusted under 35 U.S.C. 154(b) by 0 days.

(21) Appl. No.: 17/947,404

(22) Filed: Sep. 19, 2022

(65) Prior Publication Data
US 2023/0099953 A1 Mar. 30, 2023

(30) Foreign Application Priority Data
Sep. 17, 2021 (CN) .......................... 202111092672.6

(51) Int. Cl.
*G06F 30/17* (2020.01)
*G06F 30/23* (2020.01)
(Continued)

(52) U.S. Cl.
CPC .............. *G06F 30/17* (2020.01); *G06F 30/23* (2020.01); *G06F 2111/04* (2020.01); *G06F 2119/10* (2020.01)

(58) Field of Classification Search
CPC .......... G06F 30/00; G06F 30/17; G06F 30/23; G06F 2111/04; G06F 2119/04; G06F 2119/10; G06F 2119/14
(Continued)

(56) References Cited

FOREIGN PATENT DOCUMENTS

| CN | 110688795 A | | 1/2020 |
|---|---|---|---|
| CN | 111709085 A | * | 9/2020 |

(Continued)

OTHER PUBLICATIONS

Assaee, H. et al., "Forced Vibration Analysis of Composite Cylindrical Shells using Spline Finite Strip Method", Sep. 30, 2015, Thin-Walled Structures 97, Elsevier Ltd. (Year: 2015).*

(Continued)

*Primary Examiner* — Cedric Johnson
(74) *Attorney, Agent, or Firm* — Westbridge IP LLC

(57) ABSTRACT

Disclosed is a robust topology optimization design method of a damping composite stiffened cylindrical shell box structure, comprising: constructing working load data, and obtaining circumferential target modal frequencies based on the working load data and the stiffened cylindrical shell box; laying constrained layer damping materials on the stiffened cylindrical shell box to construct a damping composite stiffened cylindrical shell box; constructing interval parameters based on the damping composite stiffened cylindrical shell box, and obtaining modal loss factor based on the interval parameters; constructing an objective function based on the modal loss factors, constructing design variables and constraint conditions based on the damping composite stiffened cylindrical shell box, integrating the objec- (Continued)

tive function, design variables and constraint conditions to form an interval robust topology optimization model; updating the design variables based on the interval robust topology optimization model, and obtaining an optimized topology configuration of the damping composite stiffened cylindrical shell box.

9 Claims, 12 Drawing Sheets

(51) Int. Cl.
　　　*G06F 119/10*　　　(2020.01)
　　　*G06F 111/04*　　　(2020.01)
(58) Field of Classification Search
　　　USPC ........................................................ 703/8, 6
　　　See application file for complete search history.

(56) References Cited

FOREIGN PATENT DOCUMENTS

CN　　　111709085 A　　　9/2020
CN　　　113642125 A　 *　11/2021

OTHER PUBLICATIONS

Sun, Dagang et al., "Optimization for Sandwich Damping Composite Structure: Used in Sprockets of Crawler Vehicles", 2011, Journal of Sandwich Structures and Materials 14(1), SAGE. (Year: 2011).*

First Office Action issued in counterpart Chinese Patent Application No. 202111092672.6, dated Feb. 11, 2022.

* cited by examiner

ROBUST TOPOLOGICAL OPTIMIZATION DESIGN METHOD OF DAMPING COMPOSITE STIFFENED CYLINDRICAL SHELL BOX STRUCTURE

CROSS-REFERENCE TO RELATED APPLICATIONS

This application claims priority to Chinese Patent Application No. 202111092672.6, filed on Sep. 17, 2021, the contents of which are hereby incorporated by reference.

TECHNICAL FIELD

The present disclosure relates to the technical field of optimization design of a stiffened cylindrical shell box structure, and in particular to a robust topology optimization design method of a damping composite stiffened cylindrical shell box structure.

BACKGROUND

The design for reduction gearbox of a large ship is developing towards high power, high speed and heavy load, light weight and low vibration and noise. In the deceleration system of ships, stiffened cylindrical shell structure is widely used in the reduction gearbox. While ships are running, their power transmission devices, as one of the main vibration and noise sources, lead to the vibration of reduction gearbox shell and consequently the underwater radiated noise. For various ships, acoustic stealthiness is an important tactical indication for combat capacity evaluation. Studies have shown that if the radiated noise is increased by 6 dB for a sailing ship, the enemy detecting ability and attack distance of the sonar will be doubled. Hence, more attention has been paid to control and reduction of underwater radiation noise, so as to improve not only the stealthiness but also the vitality and combat capacity of ships. Therefore, it is of great significance to study ways to reduce the vibration and noise of the reduction gearbox.

At present, damping technology is still one of the commonly used methods for suppressing vibration and noise of reduction gearbox in large-scale ships. This method is also widely used in vibration and noise reduction design in aerospace, navigation, land transportation, light and heavy industries, sports equipment, building bridges and other fields. Topology optimization of damping composite structure is an effective means to realize vibration and noise control under lightweight design requirements, and one of the most promising vibration and noise reduction technologies in engineering applications. For the optimal design of damping composite structures, such as stiffened cylindrical shell structure, maximizing modal loss factors or minimizing the vibration response at specific load is usually taken as an objective function, without considering a real working load. On the other hand, the deterministic topology optimization for damping composite structures is usually focused on, without considering the uncertainties caused by complex environment, manufacturing errors, non-uniformity of materials, etc., and generally a lack of robustness of vibration and noise reduction performance for the optimized design of damping composite stiffened cylindrical shell is resulted. Therefore, it is necessary to redefine the objective function considering the real operating load, and consider the robustness of vibration and noise control while the topology optimization is carried out for damping composite stiffened cylindrical shell.

As one of the main components of the ship transmission system, the stiffened cylindrical shell in the reduction gearbox mainly bears the working loads while the transmission system is running. These loads are transmitted to the shell box through transmission shafts and bearings, so that the vibrating shell box generates radiated noise. At the same time, the frequency and amplitude of the load acting on the bearing hole of the shell box are all variable under different rotating speeds of the transmission system, which has an important impact on a vibration response of different modes of the shell box. Then, while the damping technology is used to reduce vibration and noise, whether the modal loss factors or the vibration response is selected as the objective function, it is necessary to consider the real operating loads applying on the stiffened cylindrical shell box structure.

In addition, as an energy-consuming material for suppressing vibration, the damping material has frequency-dependent and temperature-dependent characteristics. Under different working frequencies and temperatures, the elastic modulus and loss factors of viscoelastic damping materials are varied. Therefore, it is necessary to carry out an optimal design of damping composite stiffened cylindrical shell box considering the uncertainty caused by frequency-dependent and temperature-dependent characteristics of damping materials. At the same time, it is necessary to consider a geometric uncertainty of materials, such as a fluctuation of thickness parameters. The uncertainty of these parameters makes the optimized results lack of robustness. Probabilistic model is a common method to deal with uncertain parameters, but the uncertain information of parameters in engineering is difficult to obtain completely due to experimental limitations or cost constraints. That makes an uncertainty characterization method based on probabilistic stochastic model no longer suitable in topology optimization. As an effective means to characterize uncertain parameters, interval numbers only need to know the upper and lower bounds of uncertain parameters, and is especially suitable to characterize the uncertainty for the parameters whose probability characteristics are difficult to obtain or information is insufficient.

SUMMARY

In order to solve the problems of insufficient robustness of vibration and noise reduction performance in optimal design for damping composite stiffened cylindrical shell box due to uncertainties caused by various factors in the above-mentioned prior art, the present disclosure provides a robust topology optimization design method of damping composite stiffened cylindrical shell box structure, aiming at the vibration and noise reduction of damping composite stiffened cylindrical shell box by obtaining maximum modal loss factors of a target mode under a constraint of the target performance relative uncertainty.

To achieve the above technical effects, the present disclosure provides the following technical schemes. A robust topology optimization design method of damping composite stiffened cylindrical shell box structure includes:

constructing working load data based on a transmission system where a stiffened cylindrical shell box is located, and obtaining circumferential target modal frequencies and vibration response values under the circumferential target modal frequencies based on the working load data and the stiffened cylindrical shell box;

laying constrained layer damping materials on a surface of stiffened cylindrical shell box to construct a damping composite stiffened cylindrical shell box; constructing interval parameters based on the damping composite stiffened cylindrical shell box, and obtaining modal loss factors and relative uncertainty of the damping composite stiffened cylindrical shell box considering the interval parameters, where the interval parameters and the modal loss factors are expressed as interval numbers, and the interval parameters include thickness of damping materials and elastic modulus of damping materials, and the elastic modulus of damping materials changes with circumferential working frequencies and temperature;

constructing an objective function based on the modal loss factors and vibration displacement response values at the circumferential target modal frequencies, constructing design variables and constraint conditions based on the damping composite stiffened cylindrical shell box, and integrating the objective function, the design variables and the constraint conditions to obtain an interval robust topology optimization model; and updating the design variables by a variable density method and an optimality criterion based on the interval robust topology optimization model, and obtaining an optimized topology configuration of the damping composite stiffened cylindrical shell box.

Optionally, steps for constructing working load data based on the transmission system where the stiffened cylindrical shell box is located include:

constructing a flexible dynamic model of the transmission system where the stiffened cylindrical shell box is located, where the flexible dynamic model includes the stiffened cylindrical shell box, transmission shafts, bearings and gears; and setting a number of working conditions, carrying out a series of dynamic simulation through the flexible dynamic model based on a number of the working conditions, obtaining average values and peak-to-peak values of the bearing loads in different directions under different working conditions, and constructing the working load data based on the average values and peak-to-peak values of the bearing loads.

Optionally, steps for obtaining the circumferential target modal frequencies and the vibration response values under the circumferential target modal frequencies based on the working load data and the stiffened cylindrical shell box include:

constructing the stiffened cylindrical shell box dynamic model using finite element software based on the stiffened cylindrical shell box, and setting boundary conditions and solving the stiffened cylindrical shell box dynamic model to obtain modal frequencies and strain energy distribution of finite elements, obtaining observation points based on the strain energy distribution of finite elements; and applying the working load data to the bearing holes of the dynamic model of the stiffened cylindrical shell box, and calculating a dynamic response of the stiffened cylindrical shell box to obtain vibration displacement responses, obtaining vibration displacement response average values based on the vibration displacement responses and the modal frequencies, and selecting the modal frequencies based on vibration displacement response average values to obtain the circumferential target modal frequencies and the corresponding vibration response values.

Optionally, steps for constructing interval parameters, and obtaining interval modal loss factors and relative uncertainty of the damping composite stiffened cylindrical shell box with the interval parameters include:

laying constrained layer damping materials on a surface of stiffened cylindrical shell box, based on the strain energy distribution of finite elements, to construct a damping composite stiffened cylindrical shell box, and constructing a finite element dynamic model of the damping composite stiffened cylindrical shell box;

obtaining the thickness of damping materials from the finite element dynamic model;

obtaining the elastic modulus of damping materials according to the frequency-dependent characteristics and temperature-dependent characteristics of the elastic modulus of the damping materials;

constructing the modal loss factors and relative uncertainty based on the finite element dynamic model, and the thickness and elastic modulus of damping materials, where the thickness of damping materials, elastic modulus of damping materials and modal loss factors are defined as interval numbers.

Optionally, steps for constructing the objective function include:

obtaining weighting coefficients for the modal loss factors, according to the vibration displacement response values at the circumferential target modal frequencies, and obtaining a weighted sum of modal loss factors based on the weighting coefficients; taking a weighted sum of modal loss factors as the objective function in which these modal loss factors are the interval median values of the modal loss factors expressed as interval numbers.

Optionally, steps for constructing constraint conditions include:

constructing robustness constraint, volume constraint and interval parameter constraint respectively based on the circumferential target modal frequencies and obtained interval parameters and relative uncertainty of the damping composite stiffened cylindrical shell box;

constructing design variable constraint based on the design variables; and taking the robustness constraint, the volume constraint, the interval parameter constraint and the design variable constraint as the constraint conditions.

Optionally, steps for constructing the robustness constraint include:

constraining the relative uncertainty, based on the relative uncertainty, by setting a relative uncertainty threshold to realize the robustness constraint.

Optionally, steps for topology optimization design by the variable density method and the optimality criterion include:

obtaining natural frequencies in the interval robust topology optimization model based on the circumferential target modal frequencies and interval parameters, obtaining elastic modulus sample points based on the natural frequencies, obtaining thickness sample points of the damping materials based on the interval parameters, and obtaining parameter sets based on the thickness sample points of the damping materials and the elastic modulus sample points; correcting the natural frequencies by an iterative method based on the parameter sets; calculating the objective function and the constraint conditions based on correction results; updating the design variables by the variable density method and the optimality criterion, and obtaining the optimized topology configuration of the damping composite stiffened cylindrical shell box.

Optionally, steps for obtaining elastic modulus sample points include:

obtaining a fluctuation interval of a real part of the elastic modulus based on the natural frequencies; selecting a plurality of sample points from the fluctuation interval of the real part of the elastic modulus to obtain the elastic modulus sample points.

Optionally, steps for correcting the natural frequencies by iterative method include:

calculating corrected natural frequencies based on the parameter sets, searching parameter sets corresponding to the corrected natural frequencies based on the corrected natural frequencies, and continuing calculating next corrected natural frequency based on the parameter sets corresponding to the corrected natural frequency, repeating above steps, and stopping an iteration to obtain the correction result when the corrected natural frequencies reach a convergence condition.

The disclosure has the following technical effects.

Aiming at the vibration and noise reduction of the damping composite stiffened cylindrical shell box, the disclosure proposes a robust topology optimization design method of the damping composite stiffened cylindrical shell box with interval parameters, and the design method considers the uncertainties of geometric parameters and material property parameters of the damping composite stiffened cylindrical shell box, in particular, the uncertainties of elastic modulus and loss factors of viscoelastic damping materials due to the influence of factors such as temperature and vibration frequency, so as to maximize the modal loss factors of the target mode under the constraint of the target performance relative uncertainty. Through above-mentioned technical schemes, the optimized topology configuration of the damping composite stiffened cylindrical shell box is obtained, influences of uncertainties caused by various factors are reduced, and the robustness of the vibration and noise reduction performance of the damping composite stiffened cylindrical shell box optimization design in the vibration and noise reduction optimization design is greatly improved.

BRIEF DESCRIPTION OF THE DRAWINGS

In order to more clearly explain the embodiments of the present disclosure or the technical schemes in the prior art, the following will briefly introduce the drawings that need to be used in the embodiments.

DETAILED DESCRIPTION OF THE EMBODIMENTS

The following will clearly and completely describe the technical scheme in the embodiments of the disclosure with reference to the drawings in the embodiments of the disclosure.

In order to solve the problems existing in the prior art, the present disclosure provides the following technical scheme. A transmission system structure involved in the present disclosure is mainly composed of a stiffened cylindrical shell box, transmission pairs, shafts, bearings and so on. The stiffened cylindrical shell box is mainly subjected to dynamic excitation generated by the transmission system. For single-stage deceleration, frequencies of these exciting forces are mainly meshing frequencies. When these excitation frequencies are close to or consistent with natural frequencies of the stiffened cylindrical shell box, the stiffened cylindrical shell box may generate resonance and radiate noise, and it may also lead to large vibration displacement in some parts of the stiffened cylindrical shell box, resulting in the failure of the stiffened cylindrical shell box and affecting the normal work of the stiffened cylindrical shell box.

Figure 6:
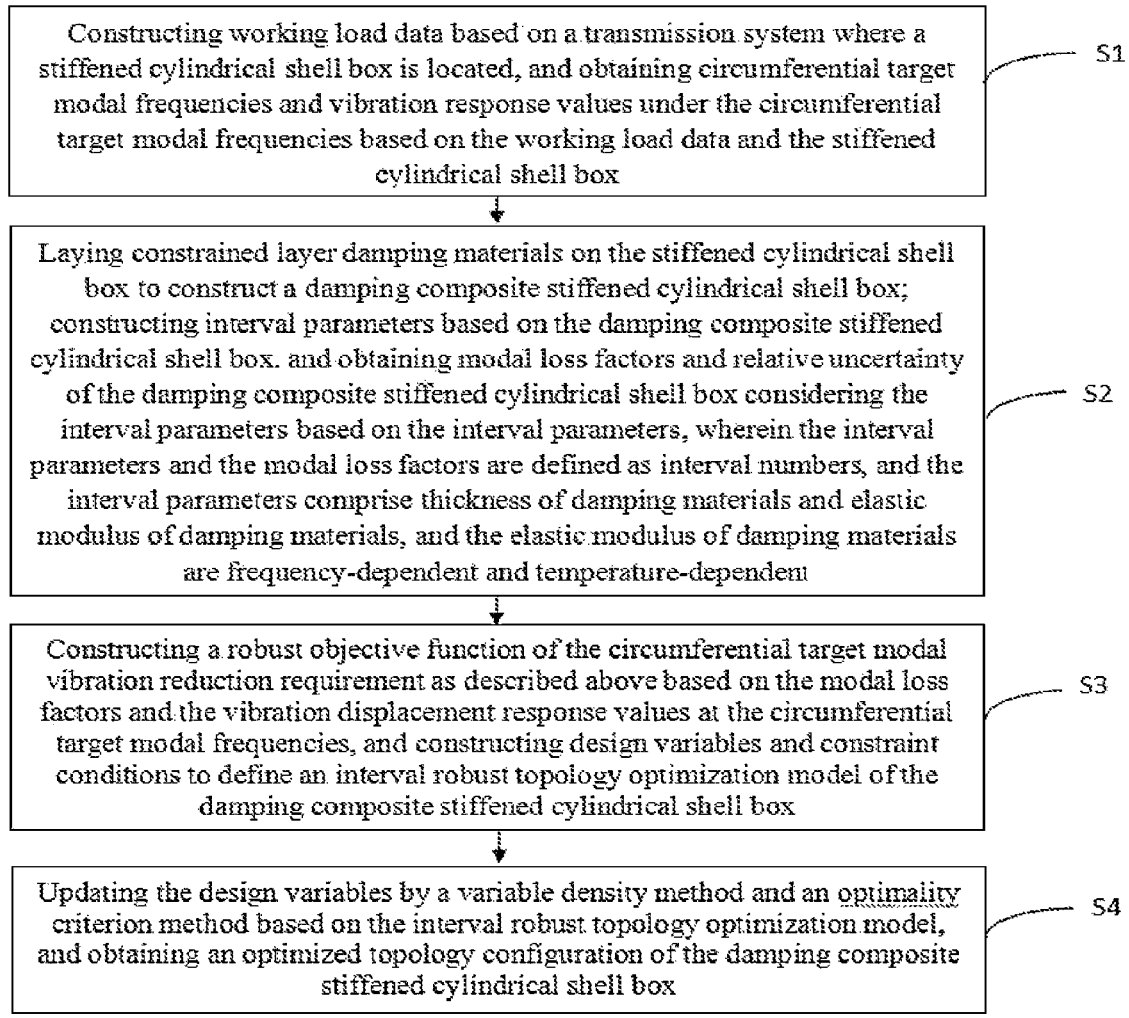
FIG. 6 is a flow chart of a robust topology optimization design method of a damping composite stiffened cylindrical shell box structure.

As shown in FIG. 6, S1, working loads are constructed based on the transmission system where the stiffened cylindrical shell box is located, and circumferential target modal frequencies and vibration response values at circumferential target modal are obtained based on the load data and the stiffened cylindrical shell box.

Figure 1:
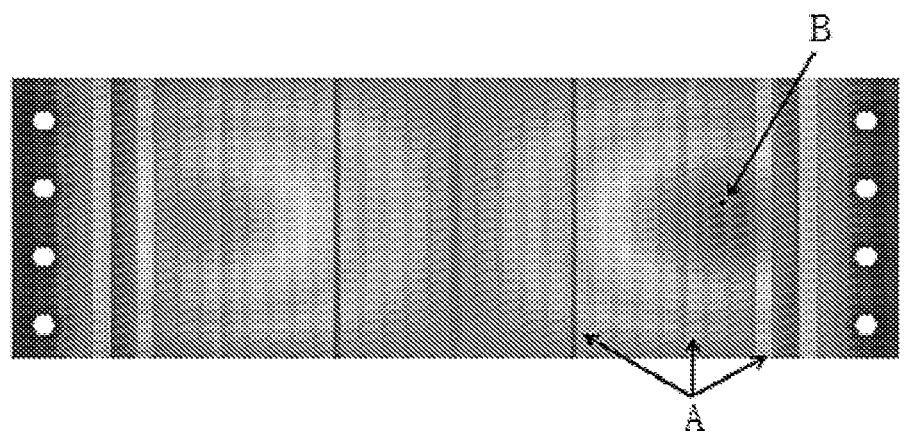
FIG. 1 is a schematic diagram of a region with large modal strain energy at certain order frequency.
Figure 7:
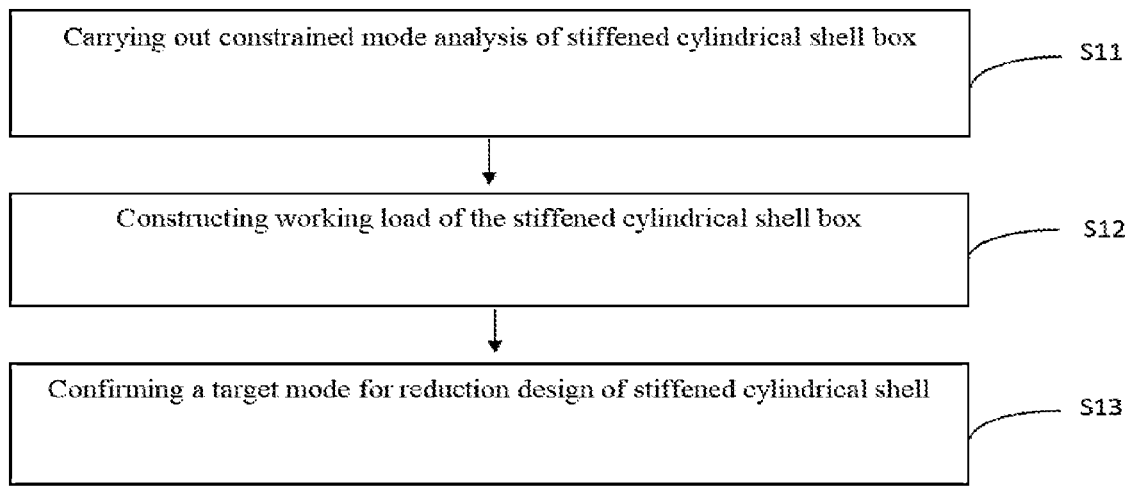
FIG. 7 is a flow chart of constructing working load data based on a transmission system where a stiffened cylindrical shell box is located, and obtaining circumferential target modal frequencies and vibration response values under the circumferential target modal frequencies based on the working load data and the stiffened cylindrical shell box.

As shown in FIG. 7, S11, constrained modal analysis of stiffened cylindrical shell box is carried out. In a finite element software, the stiffened cylindrical shell box is meshed, and boundary conditions are set and a finite element dynamic model is established and solved, so as to obtain first NZ order circumferential modal frequencies and vibration modes of the stiffened cylindrical shell box, and a strain energy distribution of finite elements in each order circumferential mode. By analyzing the strain energy distribution of each order circumferential mode, areas with large strain energy under the first NZ order circumferential constraint modal of the stiffened cylindrical shell that need attention are identified, nodes with the largest strain energy of each order mode are respectively selected in these areas as observation points for a subsequent dynamic response analysis, and these nodes are recorded as $Q_j$ (j=1, 2, ... $N_b$). The modal frequencies corresponding to $N_b$ observation points $Q_j$ are recorded as $\{f_j, j=1, 2, ... N\}$. Finally, R nodes are obtained by merging duplicate nodes in nodes $Q_j$, where the number of nodes $Q_j$ is $N_b$, and the R nodes are recorded as $\{U_r, r=1, 2, ... R\}$. An area with larger modal strain energy in a certain order frequency is shown in FIG. 1, where A indicates stiffened ribs and B is a position with largest modal strain energy.

S12, working load of the stiffened cylindrical shell box is constructed. A three-dimensional model of transmission system structure including the stiffened cylindrical shell box, the transmission pairs, the transmission shafts and the bearings is established. The three-dimensional model is imported into the finite element software to create a modal neutral file. The modal neutral file is imported into a multibody dynamics software, and a flexible dynamics model of transmission system is established.

A rotating speed range of an input shaft of the transmission system in the stiffened cylindrical shell box is set as $0-n_b$ (r/min). The rotating speed range $0-n_b$ (r/min) of the transmission system is divided into discrete speed points according to equally spaced $$\frac{n_b}{60},$$

and the number of the discrete speed points takes round number as $$m = \left[\frac{n_b}{60}\right]$$

([•] means rounding a number). Then, m sub-working conditions with different rotating speeds are formed, and corresponding rotating speeds are expressed by a sequence $[n_1, n_2, n_3 \ldots, n_m]$, and torque corresponding to rotating speeds is expressed by a sequence $[T''_1, T''_2, T''_3, \ldots T''_m]$. Then rotating speeds and torque corresponding to m sub-working conditions are expressed by following sequence:

$$P=\{(n_i T''_i)\}\ i=1,2,3 \ldots m \quad (1)$$

and then a meshing frequency sequence of the transmission system corresponding to m sub-working conditions is expressed as:

$$\Omega = [\omega_1, \omega_2, \omega_3, \ldots, \omega_m], \quad (2)$$

$$\omega_i = \frac{n_i z}{60},\ i = 1, 2, \ldots m, \quad (3)$$

where z is the number of teeth of an input shaft gear.

Dynamic simulations are carried out on m sub-working conditions of the transmission system defined in formula (1) respectively. After the transmission system reaches a steady-state operation, the gear transmission pairs generate periodic loads, which are transmitted to the stiffened cylindrical shell box, causing the stiffened cylindrical shell box to generate forced vibration. The number of bearing holes in the stiffened cylindrical shell box is set as p, and extract average values and peak-to-peak values of loads in X, Y and Z directions at the bearing holes after the transmission system reaches the steady state under m sub-conditions. Then, the loads $F_{xij}$, $F_{yij}$ and $F_{zij}$ in the X, Y and Z directions at a jth bearing hole under an ith working condition are expressed as:

$$F_{xij}=(F_{mxij}, F_{axij}), i=1,2\ldots,m\ j=1,2,\ldots,p \quad (4),$$

$$F_{yij}=(F_{myij}, F_{ayij}), i=1,2\ldots,m\ j=1,2\ldots p \quad (5),$$

$$F_{zij}=(F_{mzij}, F_{azij}), i=1,2\ldots,m\ j=1,2,\ldots,p \quad (6),$$

where $F_{mxij}$ represents the average values of loads in X direction at the jth bearing hole under the ith working condition;

$F_{axij}$ represents the peak-to-peak values of loads in X direction at the jth bearing hole under ith working condition;

$F_{myij}$ represents the average values of loads in Y direction at the jth bearing hole under ith working condition;

$F_{ayij}$ represents the peak-peal values of loads in Y direction at the jth bearing hole under ith working condition;

$F_{mzij}$ represents the average values of loads in Z direction at the jth bearing hole under ith working condition; and $F_{azij}$ represents the peak-to-peak values of loads in Z-direction load at the jth bearing hole under the ith working condition.

In an embodiment, taking the ith working condition and the jth bearing hole as an example, the loads applied to the jth bearing hole in X, Y and Z directions are constructed using average values and peak-to-peak values of loads in X, Y and Z directions as follows:

$$\tilde{F}_{xij} = \frac{F_{axij}}{2}\sin(\omega_i t) + F_{mxij},\ i = 1, 2 \ldots, m,\ j = 1, 2, \ldots, p, \quad (7)$$

$$\tilde{F}_{yij} = \frac{F_{ayij}}{2}\sin(\omega_i t) + F_{myij},\ i = 1, 2 \ldots, m,\ j = 1, 2, \ldots, p, \quad (8)$$

$$\tilde{F}_{zij} = \frac{F_{azij}}{2}\sin(\omega_i t) + F_{mzij},\ i = 1, 2 \ldots, m,\ j = 1, 2, \ldots, p, \quad (9)$$

where $\tilde{F}_{xij}$ represents a sinusoidal load in X direction at the jth bearing hole under the ith working condition;

$\tilde{F}_{yij}$ indicates a sinusoidal load in Y direction at the jth bearing hole under ith working condition; and $\tilde{F}_{zij}$ indicates a sinusoidal load in Z direction at the jth bearing hole under ith working condition.

In an embodiment, for m working conditions and the jth bearing hole, a load sequence applied to the jth bearing hole in X, Y and Z directions is constructed as follows:

$$F_{xj}=\{[\tilde{F}_{xij}]_p, i=1,2\ldots,m\} \quad (10),$$

$$F_{yj}=\{[\tilde{F}_{yij}]_p, i=1,2\ldots,m\} \quad (11),$$

$$F_{zj}=\{[\tilde{F}_{zij}]_p, i=1,2\ldots,m\} \quad (12),$$

where a time history of $\tilde{F}_{xij}$, $\tilde{F}_{yij}$ and $\tilde{F}_{zij}$ loads is $\Delta t$, and a total time of $F_{xj}$, $F_{yj}$ and $F_{zj}$ loads is $m\Delta t$, $j=1, 2, \ldots, P$. Then, load sequence of formulas (10), (11) and (12) is an excitation curve of sinusoidal load in X, Y and Z directions applied to p bearing holes. This sinusoidal load is used as an excitation load at centers of the bearing holes in the dynamic response analysis.

S13, a target mode for vibration reduction design of stiffened cylindrical shell is confirmed. In order to approximately simulate the dynamic response of the stiffened cylindrical shell box when the rotating speed of the input shaft of the transmission system changes from 0 to $n_b$(r/min), the loads in three directions of the p bearing holes obtained in S12 are applied to the bearing holes of the shell box, and the dynamic response of the stiffened cylindrical shell box is calculated in the finite element software. The total simulation time is $m\Delta t$. The dynamic displacement responses in time domain are output at each observation point $\{U_r, r=1, 2, \ldots R\}$ defined in S11, and the vibration displacement responses of observation point $\{Ur, r=1, 2, \ldots R\}$ in frequency domain are obtained by using fast fourier transform method. The vibration displacement responses at observation point {Ur, r=1, 2, . . . R} in frequency domain are recorded as:

$$\{u_r(f), r=1,2,\ldots,R\} \tag{13}.$$

A value corresponding to the modal frequency $f_3$ of the stiffened cylindrical shell box is found out in a rth group of vibration displacement responses $u_r(f)$, and is recorded as $d_r(f_j)$. Then average values of R group of vibration displacement responses $u_r(f)$ at modal frequencies $f_3$ are:

$$d_j = \frac{\sum_{1}^{R} d_r(f_j)}{R}, r = 1, 2, \ldots R. \tag{14}$$

The vibration displacement response average values $\{d_1, d_2, d_3, d_N\}$ at N modal frequencies $\{f_j, j=1, 2, \ldots N\}$ are compared and a first two frequency points with the largest vibration displacement response average values are selected. Here, it is assumed that the two frequency points with the largest vibration displacement response average values are first two order circumferential modal frequencies of the stiffened cylindrical shell box, and they are recorded as $f_1^0$ and $f_2^0$. These two largest vibration displacement response average values are recorded as $d_{max1}$ and $d_{max2}$.

S2, a damping composite stiffened cylindrical shell box is constructed, interval parameters are constructed, and based on the interval parameters, interval modal loss factors and its relative uncertainty (a basis of defining objective function during optimization design) of the damping composite stiffened cylindrical shell box are constructed considering the interval parameters, where the interval parameters are expressed as interval numbers, and the interval parameters include thickness of damping materials and elastic modulus of damping materials, and the elastic modulus of damping materials changes with working frequencies and temperature.

Figure 2:
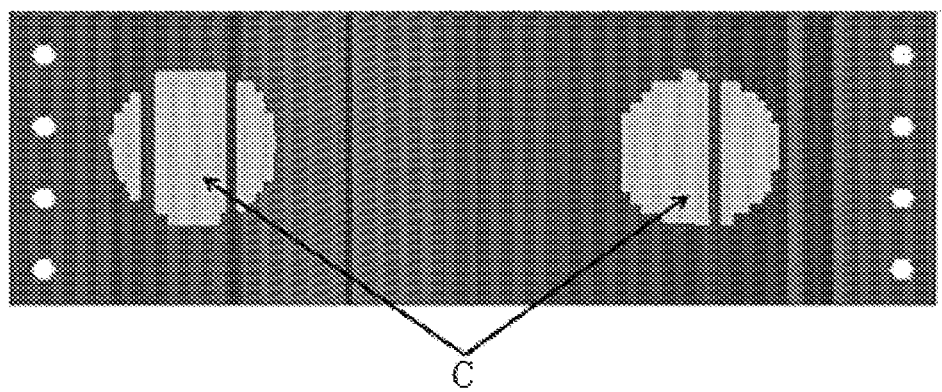
FIG. 2 is a schematic diagram of initialization of constrained layer damping material layout.
Figure 8:
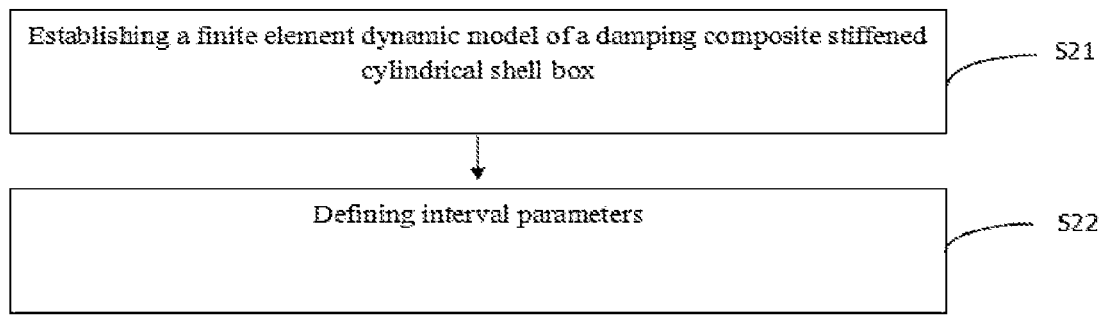
FIG. 8 is a flow chart of constructing a damping composite stiffened cylindrical shell box; constructing interval parameters, and obtaining modal loss factors and relative uncertainty of the damping composite stiffened cylindrical shell box with the interval parameters based on the interval parameters.

As shown in FIG. 8, S21, a finite element dynamic model of the damping composite stiffened cylindrical shell box is established. Constrained layer materials and damping layer materials are laid according to a circumferential strain energy distribution of the stiffened cylindrical shell box to form the damping composite stiffened cylindrical shell box. Specifically, the constrained layer and damping layer materials (except reinforcing ribs marked by A) are laid at positions where the strain energy of the stiffened cylindrical shell box is greater than $\xi_0$, as shown in FIG. 2. C is where the constrained layer damping materials are laid. The stiffened cylindrical shell box and the constrained layer are set as shell elements while the damping layer between the two layers adopts solid elements, and the finite element dynamic model of damping composite stiffened cylindrical shell box is established in the finite element software.

S22, the interval parameters are defined. For the finite element dynamic model of damping composite stiffened cylindrical shell box, the thickness and elastic modulus of damping layer laid on the circumferential surface of stiffened cylindrical shell box are defined as interval parameters. The thickness of damping layer is recorded as:

$$h^I = [h^L, h^U] \tag{15}.$$

As for the elastic modulus of the damping materials, it has frequency-dependent and temperature-dependent characteristics. Under operating frequency interval $[f^L, f^U]$ and temperature-dependent interval $[T^L, T^U]$ of the transmission system, the elastic modulus of the damping layer is expressed as:

$$E^{*I}(f,T) = [1+i'\gamma^I(f,T)]E^I(f,T) \tag{16},$$

where $E^{*I}(f,T)$ is a fluctuation interval of elastic modulus of damping layer with frequency f and temperature T, $\gamma^I(f,T)$ represents a fluctuation interval of damping material loss factors with frequency f and temperature T, and f and T are the load frequency and ambient temperature of damping composite stiffened cylindrical shell box; $EI(f,T)$ is a fluctuation interval of a real part of the elastic modulus, and i' is an imaginary unit.

Figure 3:
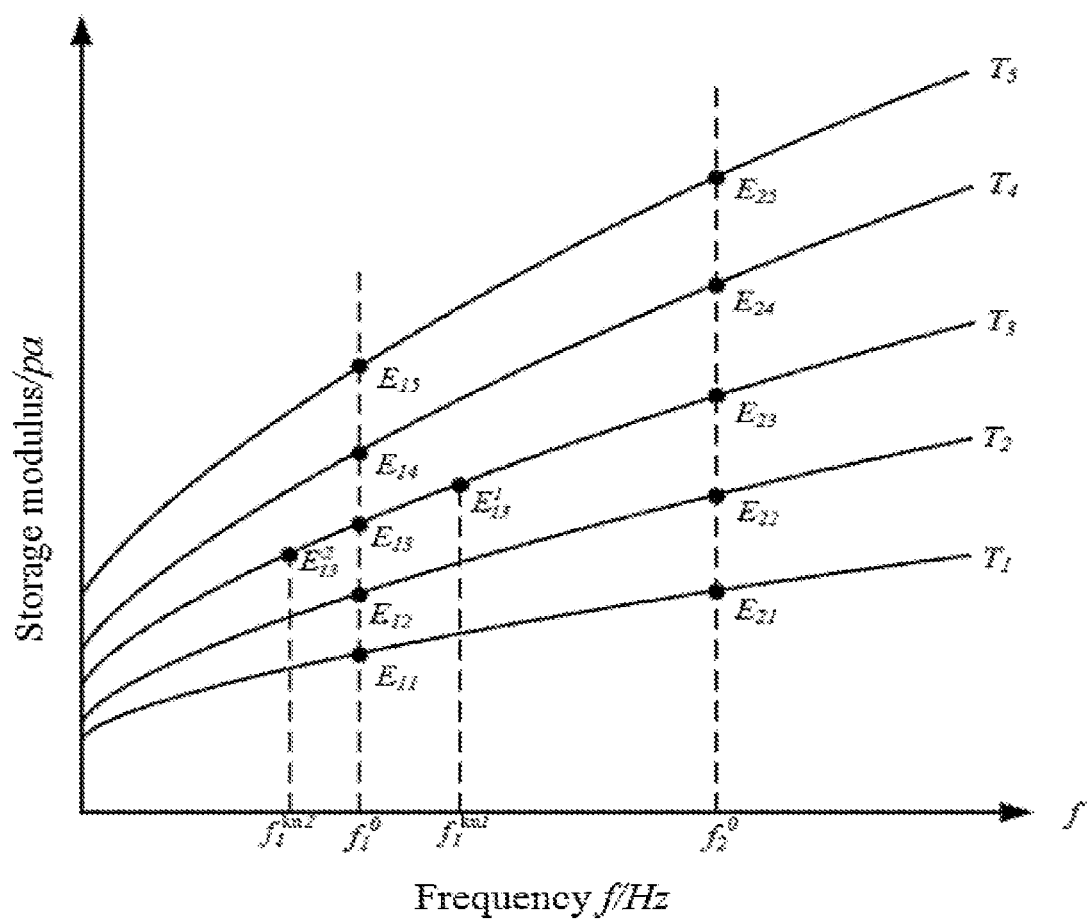
FIG. 3 is a graph of frequency-dependent characteristics of damping materials.
Figure 4:
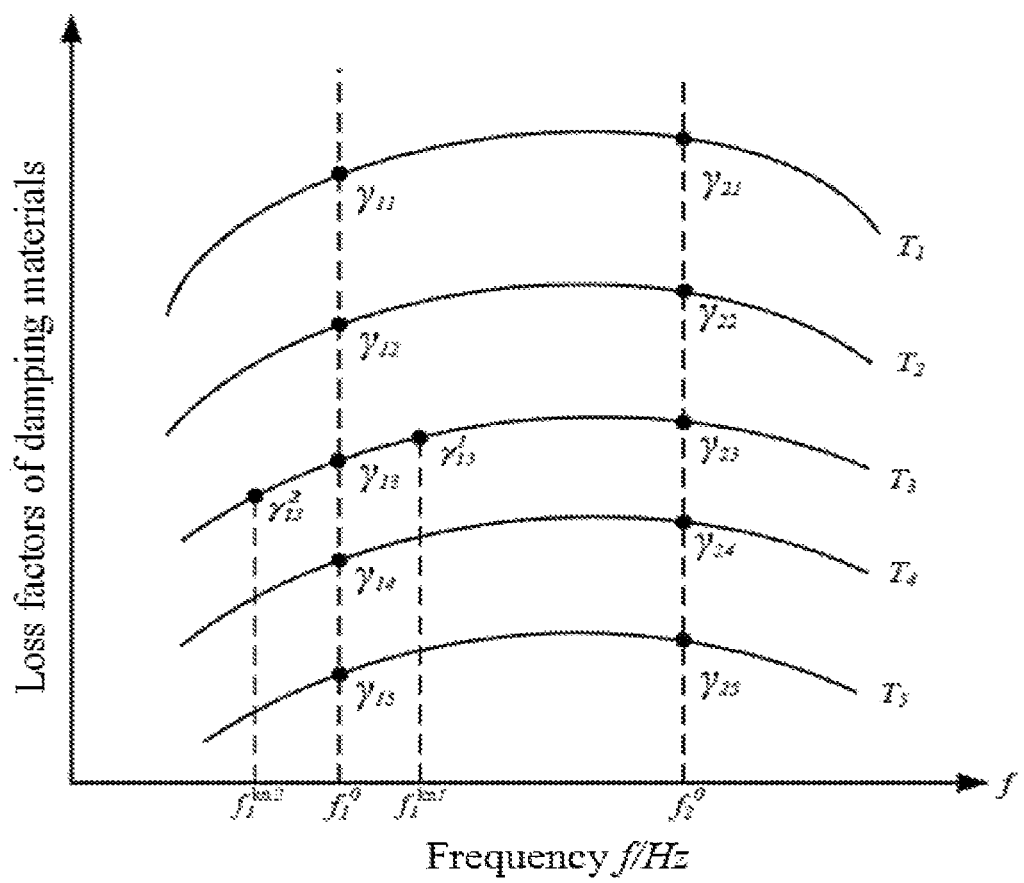
FIG. 4 is a graph of temperature-dependent characteristics of damping materials.

As shown in FIGS. 3-4, at a first-order modal frequency $f_1^0$ and the temperature-dependent interval $[T_1, T_5]$, the fluctuation intervals of the real part of the elastic modulus of the damping materials and the material loss factors are:

$$E^I = [E^L, E^U] = [E((f_1^0, T_1), E(f_1^0, T_5)] \tag{17},$$

$$\gamma^I(f,T) = [\gamma^I(f_1^0, T_5), \gamma^I(f_1^0, T_1)] \tag{18}.$$

As shown in FIGS. 3-4, at temperature $T_3$ and frequency $[(f_1^0)^L, (f_1^0)^U]$, the fluctuation intervals of the real part of the elastic modulus of the damping materials and material loss factors are:

$$E^I = [E^L, E^U] = [E((f_1^0)^L, T_3), E((f_1^0)^U, T_3)] \tag{19},$$

$$\gamma^I(f,T) = [\gamma^I((f_1^0)^L, T_3), \gamma^I((f_1^0)^U, T_3)] \tag{20}.$$

In the finite element software, for the elastic modulus of damping materials, only the real part of the elastic modulus needs to be defined. Then, based on a modal strain energy method, the modal loss factors of the damping composite stiffened cylindrical shell box become interval numbers and are recorded as:

$$\eta_r^I(x, P^I) = \gamma^I(f, T)\frac{(MSE)_v}{(MSE)_g} = \gamma^I(f, T)\frac{\sum\{(\Phi^e)^T K_v^e \Phi^e\}}{\sum\{(\Phi^e)^T K^e \Phi^e\}}, \tag{21}$$

where x is an existing state of constrained layer damping materials composite element on the surface of the stiffened cylindrical shell, x=1 indicates that the constrained layer damping materials are laid, x=0.001 indicates that the constrained layer damping materials are not laid, $p^I = [h^I, E^I]$ indicates interval vector composed of the thickness $h^I$ of damping layer and the real part $E^I$ of damping layer elastic modulus defined as interval parameters, $K^e$ and $K_v^e$ are an element stiffness matrix of the damping composite stiffened cylindrical shell box and an element stiffness matrix of the damping layer, respectively, and $\Phi^e$ indicates an element vibration mode vector.

A weighted sum of modal loss factors of the first-order mode and second-order mode is:

$$\sum_{r=1}^{2} w_r \eta_r^I(x, P^I). \tag{22}$$

weighting coefficients $w_r$ are defined according to the two largest vibration displacement response average values in S13 as:

$$w_1 = \frac{d_{max1}}{d_{max1} + d_{max2}}, w_2 = \frac{d_{max2}}{d_{max1} + d_{max2}}. \quad (23)$$

Relative uncertainty of the modal loss factors is defined as:

$$R_r = \frac{\eta_r^w(x, P^I)}{\eta_r(x, P^c)}, \quad (24)$$

where $$\eta_r(x, P^c) = \frac{\eta_r^U(x, P^I) + \eta_r^L(x, P^I)}{2}$$

indicates an interval median value of an rth-order modal loss factor when uncertain parameters $\eta_r^U(x,P^I)$ and $\eta_r^L(x,P^I)$ take a median value $P^c$;

$\eta_r^U(x,P^I)$ and $\eta_r^L(x,P^I)$ are upper and lower bounds of the fluctuation interval of modal loss factors;

$$\eta_r^w(x, P^c) = \frac{\eta_r^U(x, P^I) - \eta_r^L(x, P^I)}{2}$$

represents a radius of the fluctuation interval of the rth-order modal loss factors.

S3, a robust objective function of the circumferential target mode vibration reduction requirement as described above is constructed based on the modal loss factors and the vibration displacement response values at the circumferential target modal frequencies, and design variables and constraint conditions are constructed to define an interval robust topology optimization model of the damping composite stiffened cylindrical shell box.

Figure 9:
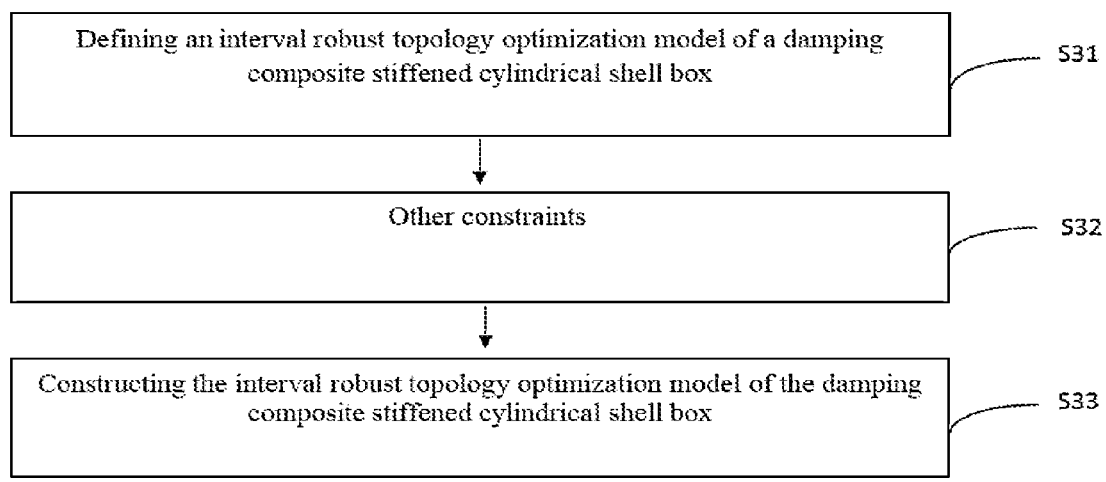
FIG. 9 is a flow chart of constructing a robust objective function of the circumferential target mode vibration reduction requirement as described above based on the modal loss factors and the vibration displacement response values at the circumferential target modal frequencies, and constructing design variables and constraint conditions to define an interval robust topology optimization model of a damping composite stiffened cylindrical shell box.
Figure 10:
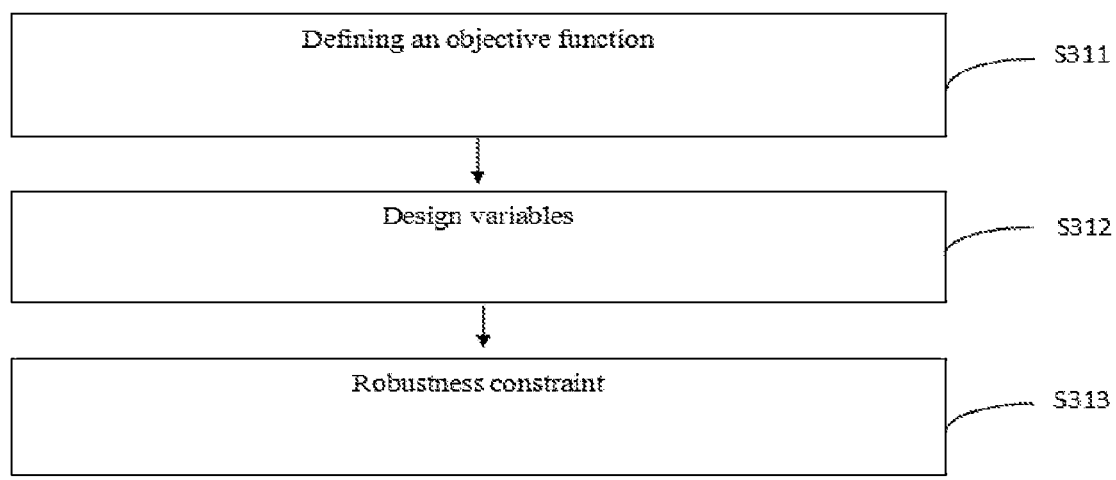
FIG. 10 is a flow chart of defining an interval robust topology optimization model of a damping composite stiffened cylindrical shell box.

As shown in FIG. 9, S31, the interval robust topology optimization model of damping composite stiffened cylindrical shell box is defined, including:

as shown in FIG. 10, S311, objective function: according to formula (22), the weighted sum of the interval median values of the modal loss factors of the first-order mode and second-order mode when the uncertain parameters take the median value $P^c$ is defined as a new objective function:

$$obj = \sum_{r=1}^{2} w_r \eta_r(x, P^c); \quad (25)$$

S312, design variables: $x_t$ indicates an existing state of a tth constrained layer damping composite element on the surface of the stiffened cylindrical shell, $x_t=1$ indicates that the constrained layer damping materials are laid, and $x_t=0.001$ indicates that the constrained layer damping materials are not laid; and S313, robustness constraint: the relative uncertainty constraint of modal loss factors of first-order mode and second-order mode is defined to ensure that the relative uncertainty of modal loss factors of first-order mode and second-order mode is less than preset relative uncertainty of modal factors, as follows:

$$\frac{\eta_1^w(x, P^I)}{\eta_1(x, P^c)} \le R_1^*, \frac{\eta_2^w(x, P^I)}{\eta_2(x, P^c)} \le R_2^*, \quad (26)$$

where $R_r^*$ represents the relative uncertainty of preset rth-order modal loss factors.

Figure 11:
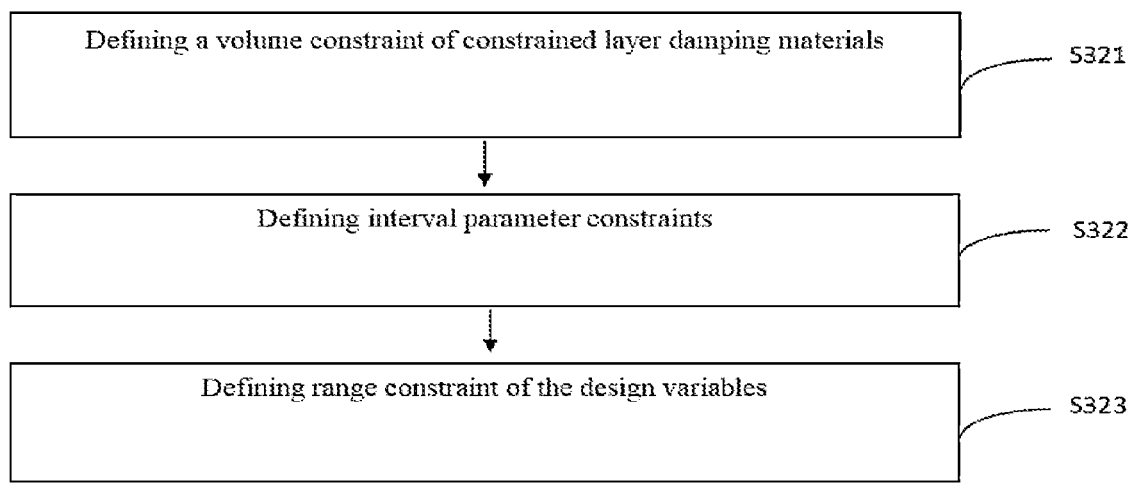
FIG. 11 is a flow chart of defining other constraint conditions.

S32, other constraints:

as shown in FIG. 11, S321, defining the volume constraint of the constrained layer damping materials, and recording it as:

$$Pr(V(x, P^I) \le V^{*I}) = \frac{V^{*U} - V(x, P^I)^L}{2(V(x, P^I)^W + V^{*W})} \ge \lambda_p, \quad (27)$$

where $V^{*I}$ represents interval volume constraint of constrained layer damping materials, $V(x,P^I)$ is amount of constrained layer damping materials, $Pr(\cdot)$ represents an interval possibility, and $\lambda_p$ represents a preset interval possibility level;

S322, defining interval parameter constraints:

$$P \in P^I = [P^L, P^U], P_j = [P^L, P^U], j=1,2, \ldots d \quad (28),$$

where P represents the interval parameters, superscript L, U respectively represent the lower and upper bounds of the interval parameters, and $P^I = [h^I, E^I]$ represents the interval vector composed of the thickness of damping layer $h^I$ and the real part $E^I$ of elastic modulus of damping layer defied as interval parameters;

S323, defining range constraint of the design variables:

$$0.001 \le x_t \le 1, t=1,2, \ldots, M \quad (29),$$

where $x_t$ indicates an existing state of a tth constrained layer damping material composite element on the surface of the stiffened cylindrical shell, $x_t=1$ indicates constrained layer damping materials are laid, $x_t=0.001$ indicates that constrained layer damping materials are laid, and M indicates the number of design variables.

S33, the interval robust topology optimization model of the damping composite stiffened cylindrical shell box is constructed as follows:

$$\text{find } x_t, t = 1, 2 \ldots M \quad (30)$$

$$\max \sum_{r=1}^{2} w_r \eta_r(x, P^c)(r = 1, 2)$$

$$\text{s.t. } \frac{\eta_1^w(x, P^I)}{\eta_1(x, P^c)} \le R_1^*$$

$$\frac{\eta_2^w(x, P^I)}{\eta_2(x, P^c)} \le R_2^*$$

$$Pr(V(x, P^I) \le V^{*I}) = \frac{V^{*U} - V(x, P^I)^L}{2(V(x, P^I)^W + V^{*W})} \ge \lambda_p$$

$$P \in P^I = [P^L, P^U], P_j = [P^L, P^U], j = 1, 2, \ldots d$$

$$0.001 \le x_t \le 1, t = 1, 2, \ldots, M.$$

S4, the design variables are updated, based on the interval robust topology optimization model, by a variable density method and an optimality criterion, and an optimized topology configuration of the damping composite stiffened cylindrical shell box is obtained.

Figure 5:
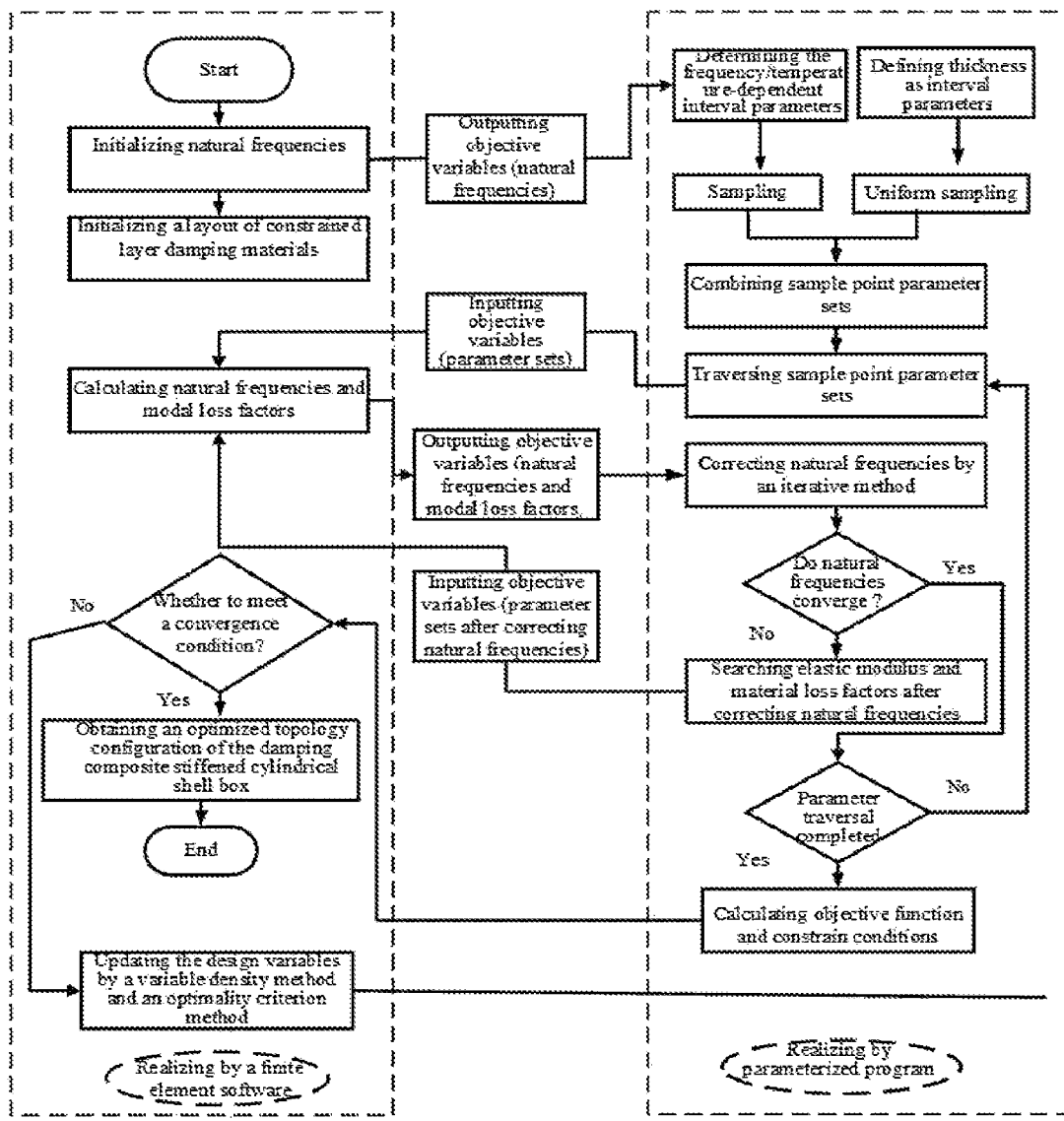
FIG. 5 is a flow chart of robust optimization design of damping composite stiffened cylindrical shell box.

Aiming at the topology optimization model in S32, a parametric program is written and combined with the finite element commercial software, and the variable density method is adopted to carry out the topology optimization design of the damping composite stiffened cylindrical shell box. The flow chart is shown in FIG. 5. The steps for topology optimization design are as follows.

Figure 12:
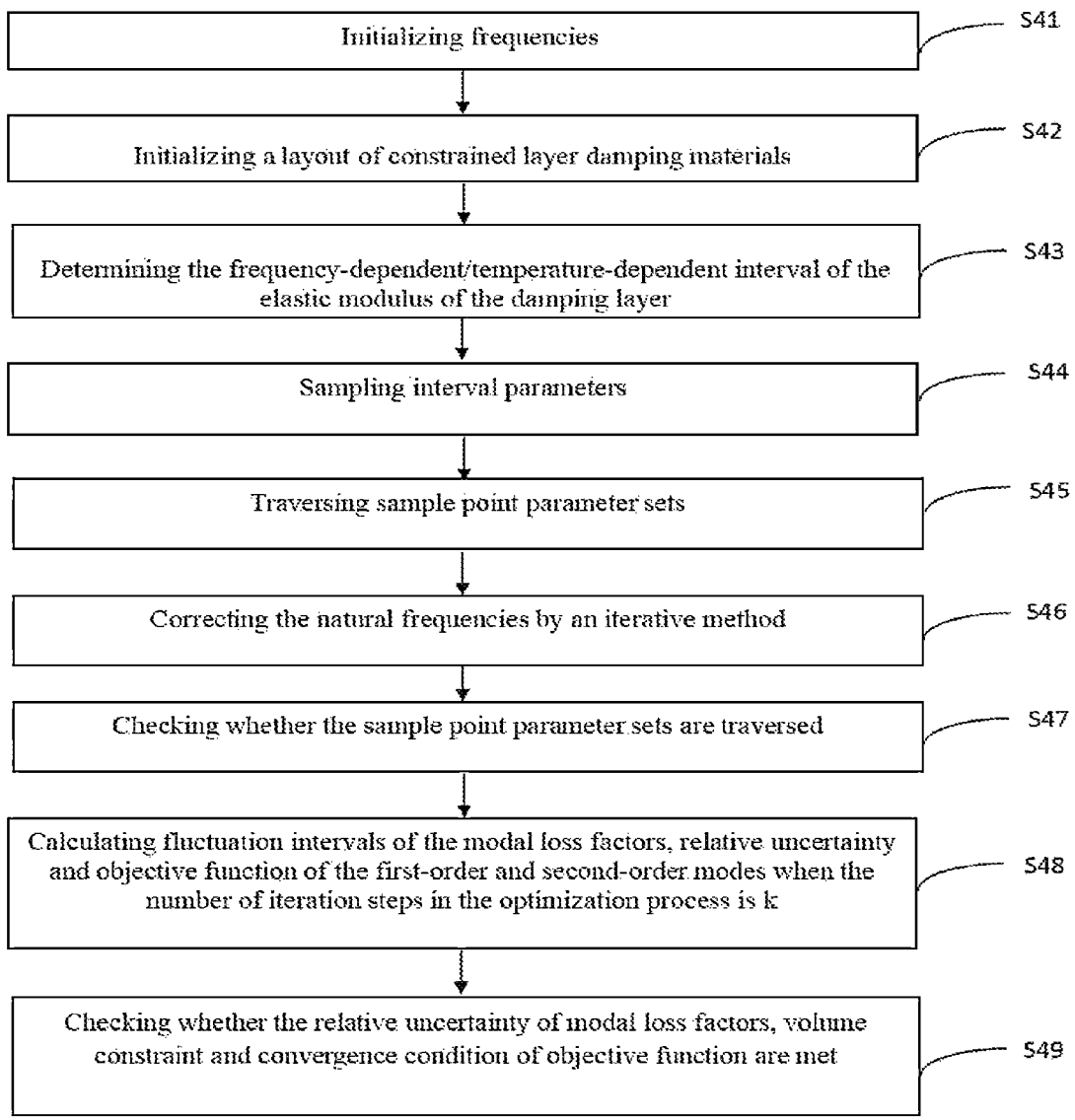
FIG. 12 is a flow chart of updating design variables by a variable density method and an optimality criterion based on an interval robust topology optimization model, and obtaining an optimized topology configuration of the damping composite stiffened cylindrical shell box.

As shown in FIG. 12, S41, initializing frequencies: the number of iteration steps in an optimization process is represented by k. When a current iteration step number k=0, in the finite element software, the natural frequency (here the target modes are the first and second order modes) $f_1^k=f_1^0$ and $f_2^k=f_2^0$ of the first-order and second-order circumferential modes of the stiffened cylindrical shell box without laying constrained layer damping materials are calculated and these two frequencies are defined as initial frequencies $f_1^0$ and $f_2^0$ (here, subscripts 1 and 2 of frequency f represent the first-order and second-order natural frequencies, superscript k represents the current iteration step, and 0 represents an initial iteration step) of the first-order and second-order modes of the stiffened cylindrical shell box.

S42, initializing a layout of constrained layer damping materials: in the finite element software, the layout of constrained layer damping materials on the surface of the damping composite stiffened shell box is initialized according to S21.

S43, determining the frequency/temperature-dependent interval of the elastic modulus of the damping layer: the fluctuation interval of the real part of the elastic modulus of the damping layer corresponding to $f_1^0$ and $f_2^0$ are found by letting $f_1^k=f_1^0$ and $f_2^k=f_2^0$ according to FIGS. 3-4 (here subscript 1 and 2 of E represent the real part of the elastic modulus of the damping layer corresponding to the first-order and second-order natural frequencies):

$$E^I=[E_1^L,E_1^U]=[E_1(f_1^k,T_1),E_1(f_1^k,T_5)] E_2^I=[E_2^L,E_2^U]=[E_2(f_2^k,T_1),E_2(f_2^k,T_5)]\quad(31),$$

where $f_1^k$ and $f_2^k$ are the first-order and second-order natural frequencies of the damping composite stiffened cylindrical shell box when the number of steps in the optimization process is k.

For example, in FIGS. 3-4, when the natural frequencies of the damping composite stiffened cylindrical shell box are $f_1^0$ and $f_2^0$, the fluctuation intervals of the real part of the elastic modulus of the corresponding damping layer are $[E_{11},E_{15}]$ and $[E_{21},E_{25}]$.

S44, sampling interval parameters: $m_t$, thickness sample points {hi}, i=12, ..., $m_t$, are uniformly selected from the thickness of damping layer $[h^L,h^U]$ interval parameters; l sample point $\{E_{1j}\}$ and $\{E_{2j}\}$ are selected respectively from the interval parameters real part $[E_1^L,E_1^U]$ and $[E_2^L,E_2^U]$ of elastic modulus of damping layer, j=1, 2, ..., l; the sample points of the thickness of damping layer and the real part of elastic modulus defined as interval parameters are combined in pairs to obtain two $m_t\times l$ sample point sets $S_1=\{h_i,E_{1j}\}_n$ and $S_2=\{h_i,E_{2j}\}_n$, where i=1, ..., $m_t$; j=1, ..., l; n=1, ..., $m_t\times l$.

S45, traversing sample point parameter sets: a nth sample point of a parameter set S1 and S2 is taken as the thickness and real part of the elastic modulus of the constrained layer damping materials on the surface of the stiffened cylindrical shell box, and an iterative process of calculating the natural frequencies and modal loss factors of the first-order and second-order modes of the damping composite stiffened cylindrical shell box is carried out.

S46, correcting the natural frequencies by an iterative method: the number of steps in the current iteration process is k, and the nth sample point is taken as the thickness and real part of the elastic modulus of the damping layer of the damping composite stiffened cylindrical shell box in sets $S_1=\{h_i,E_{1j}\}_n$ and $S_2=\{h_i,E_{2j}\}_n$ respectively. Because the elastic modulus of damping layer has frequency-dependent characteristics, the natural frequencies of damping composite stiffened cylindrical shell is calculated by iterative method and steps for correcting by iterative method are as follows:

representing the number of iteration steps of natural frequency correction by s: when s=0, the thickness and the real part of the elastic modulus of the damping layer of the damping composite stiffened cylindrical shell box correspond to the nth sample point sets $S_1=\{h_i,E_{1j}\}_n$ and $S_2=\{h_i,E_{2j}\}_n$, and the natural frequencies $f_1^{kn0}$ and $f_2^{kn0}$ (k represents an iterative step of the optimization process, n represents a sample point set number, and 0 represents the above-mentioned s=0) are calculated out. When s>0, $E_{1j}^{s-1}$, $E_{2j}^{s-1}$ and $\gamma_{1j}^{s-1}$, $\gamma_{2j}^{s-1}$ (as shown in FIGS. 3-4) corresponding to the natural frequencies $f_1^{kn(s-1)}$, $f_2^{kn(s-1)}$ are used when the iteration step is (s−1) to calculate corrected natural frequencies $f_1^{kns}$, $f_2^{kns}$ and the modal loss factors $(n_1^k)^{ns}$, $(n_1^k)^{ns}$ corresponding to the corrected natural frequencies. Checking the corrected natural frequencies is carried out to check whether the corrected natural frequencies meet convergence condition formula (32). If the convergence condition is not met, according to FIGS. 3-4, find $E_{1j}^s$, $E_{2j}^s$ and $\gamma_{1j}^s$, $\gamma_{2j}^s$ corresponding to and $f_1^{kns}$ and $f_2^{kns}$ under the current iterative step number, j=1, ..., l, repeat above steps, and perform S47 if the convergence condition is met.

$$\left|\frac{f_r^{kns}-f_r^{kn(s-1)}}{f_r^{kn(s-1)}}\right|<\varepsilon, r=1,2.,\quad(32)$$

As for $f_r^{kn(s-1)}$ and $f_r^{kns}$ are the rth-order natural frequencies at the number of iteration steps s and s+1 in the process that the natural frequencies of the damping composite stiffened cylindrical shell box are iteratively corrected; n denotes the nth sample point of the sample point sets $S_1=\{h_i,E_{1j}\}_n$ and $S_2=\{h_i,E_{2j}\}_n$, which are employed to obtain the initial values of $f_r^{kn(s-1)}$ and $f_r^{kns}$; k is iteration step number in the current optimization process; ε is an allowable error threshold of preset natural frequency iteration and c is generally 0.001.

For example, as shown in FIGS. 3-4, when l=5 and j=3 (l=5 represents 5 sample points of the elastic modulus of the temperature-dependent damping layer, and j=3 represents a third sample point), the natural frequencies of the first-order mode is the initial frequency when the natural frequencies $f_1^0$ is corrected. At this time, s=0, $E_{13}$ and $\gamma_{13}$ corresponding to $f_1^0$ are found according to FIGS. 3-4. When the first iteration step s of natural frequency correction is equal to 1, at this time, the sample points set corresponding to $f_1^0$ is $S_{1n}^0=\{h_i,E_{13}\}$, based on which corrected natural frequencies $f_1^{kn1}$ of the damping composite stiffened shell box and modal loss factors $(\eta_1^k)^{n1}$ corresponding to the corrected natural frequency are calculated. Checking whether the corrected natural frequencies meet the convergence condition of formula (32) is carried out, and if the convergence condition is met, keep iteration. If the convergence condition is not met, find $E_{13}^1$ and $\gamma_{13}^1$ corresponding to $f_1^{kn1}$ according to FIGS. 3-4 for a second iteration of natural frequency. At this time, s=2 and $S_{1n}^{\ 1}=\{h_i, E_{13}^{\ 1}\}$ corresponding to $f_1^{kn1}$ are taken as basis to calculate corrected natural frequencies of the damping composite stiffened shell box $f_1^{kn2}$ and modal loss factors $(\eta_1^k)^{n2}$ corresponding to the corrected natural frequencies. Checking whether the corrected natural frequencies meet the convergence conditions of formula (32) is performed and if the convergence conditions are met, keep iteration. If the convergence conditions are not met, find $E_{13}^{\ 2}$ and $\gamma_{13}^{\ 2}$ corresponding to $f_1^{kn2}$ according to FIGS. 3-4 and so on.

S47, checking whether the sample point parameter sets are traversed: if traversing all sample point parameter sets is completed, S48 is executed, otherwise, S45-S46 is repeated.

S48, calculating fluctuation intervals of the modal loss factors, relative uncertainty and objective function of the first-order and second-order modes when the number of iteration steps in the optimization process is k:

$$(\eta_1^k)^I = [(\eta_1^k)^L, (\eta_1^k)^U] = [\min((\eta_1^k)^1, \ldots, (\eta_1^k)^n), \max((\eta_1^k)^1, \ldots, (\eta_1^k)^n)] \quad (33)$$

$$(\eta_2^k)^I = [(\eta_2^k)^L, (\eta_2^k)^U] = [\min((\eta_2^k)^1, \ldots, (\eta_2^k)^n), \max((\eta_2^k)^1, \ldots, (\eta_2^k)^n)],$$

$$R_1^k = \frac{(\eta_1^k)^w}{(\eta_1^k)^c}, R_2^k = \frac{(\eta_2^k)^w}{(\eta_2^k)^c}, \quad (34)$$

$$(\eta_1^k)^w = \frac{(\eta_1^k)^U - (\eta_1^k)^L}{2}, (\eta_2^k)^w = \frac{(\eta_2^k)^U - (\eta_2^k)^L}{2}, \quad (35)$$

$$(\eta_1^k)^c = \frac{(\eta_1^k)^U + (\eta_1^k)^L}{2}, (\eta_2^k)^c = \frac{(\eta_2^k)^U + (\eta_2^k)^L}{2}, \quad (36)$$

$$obj_k = w_1 (\eta_1^k)^c + w_2 (\eta_2^k)^c, \quad (37)$$

where $(\eta_1^k)^I$ and $(\eta_2^k)^I$ denote the fluctuation intervals of modal loss factors of the first-order and second-order modes when the iteration step number of the optimization process is k, $(\eta_1^k)^n$ and $(\eta_2^k)^n$ denote the modal loss factors of the first-order and second-order modes of the nth sample point sets when the iteration step number of the optimization process is k, and $R_1^k$ and $R_2^k$ denote the relative uncertainty of the modal loss factors of the first-order and second-order modes when the iteration step number of the optimization process is k, and $(\eta_1^k)^w$ and $(\eta_2^k)^w$ denote fluctuation interval radius of modal loss factors of the first-order and second-order modes when the number of iteration step number of the optimization process is k, and $(\eta_1^k)^c$ and $(\eta_2^k)^c$ denote interval median values of modal loss factors of the first-order and second-order modes when the iteration step number is k and uncertain parameters take median value $P^c$.

S49, checking whether the relative uncertainty of modal loss factors, volume constraint and convergence condition of objective function are met: if the convergence conditions are not met, the variable density method and the optimality criterion are adopted to update the design variables, and S43-S49 are repeated. If the convergence conditions are met, the optimization process is finished, and the optimized topology configuration of the damping composite stiffened cylindrical shell box is obtained.

The above shows and describes the basic principle, main features and advantages of the present disclosure. Those skilled in the art should know that there will be various changes and improvements in the present disclosure without departing from the spirit and scope of the disclosure, and all these changes and improvements fall within the scope of the claimed disclosure. The scope of that disclosure is defined by the appended claim and their equivalents.

What is claimed is:

1. A robust topology optimization design method of a damping composite stiffened cylindrical shell box structure, comprising:
   constructing working load data based on a transmission system where a stiffened cylindrical shell box is located, and obtaining circumferential target modal frequencies and vibration response values under the circumferential target modal frequencies based on the working load data and the stiffened cylindrical shell box;
   laying constrained layer damping materials on the stiffened cylindrical shell box to construct a damping composite stiffened cylindrical shell box;
   constructing interval parameters based on the damping composite stiffened cylindrical shell box, and obtaining modal loss factors and relative uncertainty of the damping composite stiffened cylindrical shell box based on the interval parameters, wherein the interval parameters and the modal loss factors are defined as interval numbers, and the interval parameters comprise thickness of damping materials and elastic modulus of damping materials, and the elastic modulus of damping materials is frequency-dependent and temperature-dependent;
   constructing an objective function based on the modal loss factors and vibration displacement response values at the circumferential target modal frequencies, constructing design variables and constraint conditions based on the damping composite stiffened cylindrical shell box, and integrating the objective function, the design variables and the constraint conditions to obtain an interval robust topology optimization model, wherein the objective function is a weighted sum of modal loss factors when the modal loss factors expressed as interval numbers are taken as interval medians, the design variables are existence states of constrained layer damping materials in the stiffened cylindrical shell box, and the constraint conditions are robustness constraint, volume constraint, interval parameter constraint and design variable constraint; and
   updating the design variables by a variable density method and an optimality criterion method based on the interval robust topology optimization model, and obtaining an optimized topology design configuration of the damping composite stiffened cylindrical shell box,
   wherein steps for topology optimization design by the variable density method and the optimality criterion method comprise:
      obtaining natural frequencies in the interval robust topology optimization model based on the circumferential target modal frequencies and interval parameters,
      obtaining elastic modulus sample points based on the natural frequencies,
      obtaining thickness sample points of the damping materials based on the interval parameters, and
      obtaining parameter sets based on the thickness sample points of the damping materials and the elastic modulus sample points;
   correcting the natural frequencies by an iterative method based on the parameter sets;

calculating the objective function and the constraint conditions based on correction results; updating the design variables by the variable density method and the optimality criterion method based on calculation results, and obtaining the optimized topology design configuration of the damping composite stiffened cylindrical shell box.

2. The robust topology optimization design method of a damping composite stiffened cylindrical shell box structure according to claim 1, wherein:

steps for constructing working load data based on the transmission system where the stiffened cylindrical shell box is located comprise:

constructing a flexible dynamic model of the transmission system where the stiffened cylindrical shell box is located, wherein the flexible dynamic model comprises the stiffened cylindrical shell box, transmission shafts and bearings; and setting a number of working conditions, carrying out dynamic simulations through the flexible dynamic model based on a number of the working conditions, obtaining average values and peak-to-peak values of the bearing loads in different directions under different working conditions, and constructing the working load data based on the average values and peak-to-peak values of the bearing loads.

3. The robust topology optimization design method of a damping composite stiffened cylindrical shell box structure according to claim 2, wherein:

steps for obtaining circumferential target modal frequencies and vibration response values under the circumferential target modal frequencies based on the working load data and the stiffened cylindrical shell box comprise:

constructing a stiffened cylindrical shell box model using a finite element software based on the stiffened cylindrical shell box, and solving the stiffened cylindrical shell box model by meshing and setting boundary conditions to obtain modal frequencies and strain energy distribution of finite elements, obtaining observation points based on the strain energy distribution of finite elements; and applying the working load data to the bearings of the flexible dynamic model, and analyzing a dynamic response of the stiffened cylindrical shell box in the flexible dynamic model to obtain the vibration displacement responses, obtaining the vibration displacement response average values based on the vibration displacement responses and the modal frequencies, and selecting the modal frequencies based on the vibration displacement response average values to obtain the circumferential target modal frequencies and corresponding vibration response values.

4. The robust topology optimization design method of a damping composite stiffened cylindrical shell box structure according to claim 3, wherein:

steps for constructing interval parameters, and obtaining interval modal loss factors and relative uncertainty of the damping composite stiffened cylindrical shell box with the interval parameters comprise:

laying constrained layer damping materials on the stiffened cylindrical shell box, based on the strain energy distribution of finite elements, to construct damping composite stiffened cylindrical shell box, and constructing a finite element dynamic model of the damping composite stiffened cylindrical shell box;

obtaining the thickness of damping materials from the finite element dynamic model;

obtaining the elastic modulus of damping materials according to the frequency-dependent characteristics and temperature-dependent characteristics of the elastic modulus of the damping materials based on the finite element dynamic model; and constructing the modal loss factors and relative uncertainty based on the finite element dynamic model, and the thickness and elastic modulus of damping materials, wherein the thickness of damping materials, elastic modulus of damping materials and modal loss factors are expressed as interval numbers.

5. The robust topology optimization design method of a damping composite stiffened cylindrical shell box structure according to claim 4, wherein:

steps for constructing the objective function comprise:

obtaining weighting coefficients, based on the modal loss factors, according to the vibration displacement response values at the circumferential target modal frequencies, and obtaining a weighted sum of modal loss factors obtaining based on the weighting coefficients; and taking a weighted sum of modal loss factors as the objective function, wherein modal loss factors are interval median values of the modal loss factors expressed as interval numbers.

6. The robust topology optimization design method of a damping composite stiffened cylindrical shell box structure according to claim 1, wherein:

steps for constructing constraint conditions comprise:

constructing robustness constraint, volume constraint and interval parameter constraint respectively based on the circumferential target modal frequencies and obtained interval parameters and relative uncertainty of the damping composite stiffened cylindrical shell box;

constructing design variable constraint based on the design variables; and taking the robustness constraint, the volume constraint, the interval parameter constraint and the design variable constraint as the constraint conditions.

7. The robust topology optimization design method of a damping composite stiffened cylindrical shell box structure according to claim 6, wherein:

steps for constructing the robustness constraint comprise:

constraining the relative uncertainty, based on the relative uncertainty, by setting a relative uncertainty threshold to realize the robustness constraint.

8. The robust topology optimization design method of a damping composite stiffened cylindrical shell box structure according to claim 1, wherein:

steps for obtaining elastic modulus sample points comprise:

obtaining a fluctuation interval of a real part of the elastic modulus based on the natural frequencies; and selecting a plurality of sample points from the fluctuation interval of the real part of the elastic modulus to obtain the elastic modulus sample points.

9. The robust topology optimization design method of a damping composite stiffened cylindrical shell box structure according to claim 1, wherein:

steps for correcting the natural frequencies by the iterative method comprise:

calculating corrected natural frequencies based on the parameter sets, searching parameter sets corresponding to the corrected natural frequencies based on the corrected natural frequencies, and continuing calculating next corrected natural frequencies based on the parameter sets corresponding to the corrected natural frequencies, repeating above steps for correcting the natural frequencies, and stopping an iteration to obtain the correction results when the corrected natural frequencies reach a convergence condition.

\* \* \* \* \*